(12) United States Patent  (10) Patent No.: US 9,548,574 B2
Hsu                        (45) Date of Patent:     Jan. 17, 2017

(54) POWER SOCKET WITH PHOTO-INTERRUPTER

(71) Applicant: POWERTECH INDUSTRIAL CO., LTD., New Taipei (TW)

(72) Inventor: Jung-Hui Hsu, New Taipei (TW)

(73) Assignee: POWERTECH INDUSTRIAL CO., LTD., New Taipei (TW)

(*) Notice: Subject to any disclaimer, the term of this patent is extended or adjusted under 35 U.S.C. 154(b) by 0 days.

(21) Appl. No.: 14/874,901

(22) Filed: Oct. 5, 2015

(65) Prior Publication Data

US 2016/0226198 A1    Aug. 4, 2016

(30) Foreign Application Priority Data

Jan. 30, 2015  (TW) .............................. 104103240 A

(51) Int. Cl.
| | |
|---|---|
| *H01R 13/703* | (2006.01) |
| *H04N 1/00* | (2006.01) |
| H01R 13/66 | (2006.01) |
| H01R 24/76 | (2011.01) |
| H01R 103/00 | (2006.01) |

(52) U.S. Cl.
CPC ...... *H01R 13/7038* (2013.01); *H04N 1/00885* (2013.01); *H01R 13/6683* (2013.01); *H01R 24/76* (2013.01); *H01R 2103/00* (2013.01)

(58) Field of Classification Search
CPC ............ H01R 13/7038; H01R 13/6683; H01R 13/6691; H01R 13/717; H01R 13/7172; H01R 13/7175

USPC ...... 439/489, 490, 491, 188, 620.21, 607.23
See application file for complete search history.

(56) References Cited

U.S. PATENT DOCUMENTS

| | | | |
|---|---|---|---|
| 6,176,718 B1* | 1/2001 | Skarie .................... | H01R 13/64 439/188 |
| 6,552,888 B2* | 4/2003 | Weinberger .......... | H01R 13/713 307/125 |
| 7,133,145 B2* | 11/2006 | White ................ | H04N 1/00901 358/1.14 |
| 7,575,467 B2* | 8/2009 | Ferguson ............... | H01R 13/44 439/188 |

(Continued)

FOREIGN PATENT DOCUMENTS

| | | |
|---|---|---|
| CN | 101859964 A | 10/2010 |
| CN | 102035521 B | 12/2012 |

(Continued)

*Primary Examiner* — Abdullah Riyami
*Assistant Examiner* — Harshad Patel
(74) *Attorney, Agent, or Firm* — Li & Cai Intellectual Property (USA) Office

(57) ABSTRACT

A power socket includes a main body and a photo-interrupter. The main body has a jack set, and the jack set has a first jack and a second jack. A partition region is formed between the first jack and the second jack. The photo-interrupter is disposed in the body and under the jack set. The photo-interrupter has a first sensing portion and a second sensing portion. The first sensing portion is under the partition region, and the width of the first sensing portion is less than the width of the partition region. A sensing region is formed between the first sensing portion and the second sensing portion. The sensing region is under the first jack, and the length of the sensing region is more than or equal to the width of the first jack.

7 Claims, 8 Drawing Sheets

(56) References Cited

U.S. PATENT DOCUMENTS

| | | | |
|---|---|---|---|
| 7,825,546 B2* | 11/2010 | Li | H01R 13/7038 |
| | | | 307/326 |
| 8,550,840 B2* | 10/2013 | Mann | H01R 13/03 |
| | | | 439/489 |
| 2007/0149013 A1* | 6/2007 | Eastham | H01R 13/7036 |
| | | | 439/140 |

FOREIGN PATENT DOCUMENTS

| | | |
|---|---|---|
| CN | 103500902 A | 1/2014 |
| CN | 203631896 U | 6/2014 |

\* cited by examiner

POWER SOCKET WITH PHOTO-INTERRUPTER

BACKGROUND OF THE INVENTION

1. Field of the Invention

The present disclosure relates to a power socket; in particular, to a power socket with a photo-interrupter for sensing presence of a plug inserted in the power socket.

2. Description of Related Art

In recent years, more and more power sockets are disposed with a light sensor for sensing whether the plug is inserted into the jack set of the power socket. For example, CN Patent Pub. No CN103500902A, CN203631896 U, CN101859964 A, or CN102035521 B, disclose a power socket with a light sensor for sensing whether a plug is inserted into the jack set of the power socket. More specifically, when the plug is inserted into the jack set of the power socket, a light emitted from a light-emitting portion of the light sensor is interrupted by the plug. Correspondingly, the light-receiving portion of the light sensor does not receive the light emitted from the light-emitting portion, and then the power socket determines whether a plug is inserted into the jack set of the power socket according to the sensing result of the light sensor.

But the prior art does not disclose how to dispose the light sensor into the power socket, and only simply discloses or shows the coupled relationship of the elements in the power socket. Furthermore, U.S. Pat. No. 7,575,467 provides an electrically safe receptacle which includes a strategically placed sensor to detect the insertion of a male plug. However, U.S. Pat. No. 7,575,467 fails to specifically disclose the structure of the sensor.

In another prior art, U.S. Pat. No. 6,176,718, provides an electrical receptacle which makes use of one or more sensors to detect blade insertion, ground plug insertion, presence of the plug face motion near the receptacle face or a combination thereof. The sensors can include diffuse reflective sensors, which includes the LED and the photodetector. The LED emits lights, some or all of which can be blocked from passing through the blade aperture of the blade to strike the photodetector. Consequently, a properly inserted blade is detected by a characteristic amount of emitted light striking the photodetector after passing through the receptacle blade aperture. A greater than characteristic amount of light means that either no blade is present, or a small object such as a paper clip has been inserted. Too little light means that either the LED is burned out or a larger or adequately shaped foreign object has been inserted.

Therefore, if there is too little or too much light, the plug component sensor would indicate an unacceptable condition. If a characteristic amount of light is observed, this plug component sensor would indicate an acceptable condition. As such, the detecting means disclosed by U.S. Pat. No. 6,176,718 is not adapted to detect the blade without the aperture. Moreover, no insulation or insulating housing is disposed between the sensor and the inserted blade, so it may cause a short circuit phenomenon between the inserted blade and the sensor, an incorrect sensing result generated by the sensor, or even damage of the sensor and the power socket, which may affect the safety of the power socket.

In addition, for a common household, there are many power sockets disposed in the house and the power sockets are usually widely distributed. When many power sockets have been inserted with plugs of a plurality of electronic devices, a user may be unable to clearly know which power sockets have been inserted with a plug. Consequently, the user will be unable to effectively manage the power sockets.

SUMMARY OF THE INVENTION

An exemplary embodiment of the present disclosure provides a power socket which includes a main body and a photo-interrupter. The main body has a jack set, and the jack set has a first jack and a second jack. A partition region is formed between the first jack and the second jack. The photo-interrupter is disposed in the body and under the jack set. The photo-interrupter has a first sensing portion and a second sensing portion. The first sensing portion is under the partition region, and the width of the first sensing portion is less than the width of the partition region. A sensing region is formed between the first sensing portion and the second sensing portion. The sensing region is under the first jack, and the length of the sensing region is more than or equal to the width of the first jack.

An exemplary embodiment of the present disclosure provides a power socket which includes a main body, a photo-interrupter, and a first insulation. The main body has a jack set, and the jack set has a first jack and a second jack. A partition region is formed between the first jack and the second jack. The photo-interrupter is under the jack set and has a first sensing portion and a second sensing portion. A sensing region is formed between the first sensing portion and the second sensing portion, and the sensing region is under the first jack. The first insulation is disposed in the sensing region and at one side of the first sensing portion.

In summary, exemplary embodiments of the present disclosure provide a technique for controlling at least one power socket through wireless remote control. Each of the power sockets is disposed with at least one photo-interrupter to sense whether a plug is inserted into the jack set of the power socket. Therefore, a monitor can determine the operation state of each jack set of each power socket according to the sensing results of the photo-interrupters in the power sockets, and a user can cut off or maintain power supplied from the jack set through wireless remote control so as to provide or stop providing power to an electronic device which is connected to the jack set.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It should be understood that the usage of "first", "second" and "third" intends to distinguish one element from another, and the element should not be limited by the term. Therefore, hereinafter a first element is interchangeable with a second element. The term "and/or" includes one and one or more of the combination in the group as described.

Figure 1:
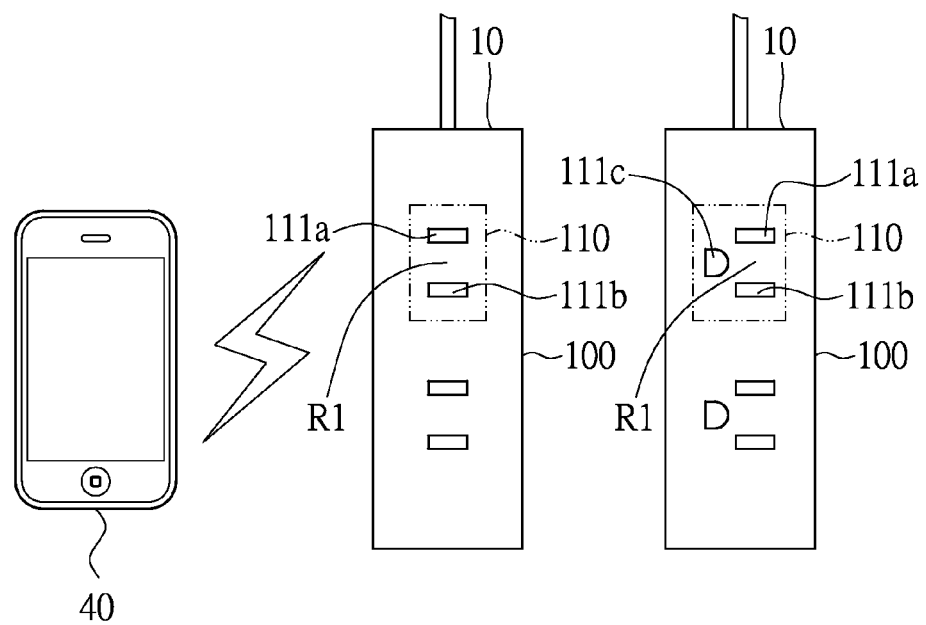
FIG. 1 is an architecture diagram of a power socket system provided in accordance to an embodiment of the present disclosure.

Please refer to FIG. 1, which shows an architecture diagram of a power socket system provided in accordance to an embodiment of the present disclosure. The power socket system 1 includes at least one power socket 10 and a monitor 40. The exact number of power sockets 10 may be configured depending upon the practical operation needs, and the instant embodiment is not limited thereto. The power socket 10 may be an extension cord socket, a wall socket or other types of socket. The power socket 10 includes at least one jack set 110. Each jack set 110 is a two-hole jack or a three-hole socket, each jack set 110 and has a plurality of jacks 111a~111b or jacks 111a~111c. A partition region R1 is formed between a jack 111a and a jack 111b. It is noted that the exact number and type of the jack sets 110 may be configured depending upon the practical operation needs, and the instant embodiment is not limited thereto. The monitor 40 may be a smart phone, a tablet PC, a desktop computer, a notebook computer, a global positioning system (GPS), or other types of electronic devices with wireless communication function.

In the instant embodiment, the power socket 10 has a function of sensing whether a plug is inserted into the jack set 110 of the power socket 10 and transmits a sensing result to the monitor 40. The monitor 40 correspondingly displays an operation state of each jack set 110 according to the sensing result received, and the user remotely cuts off or maintains power supplied from some jack set 110 through the monitor 40.

Figure 2:
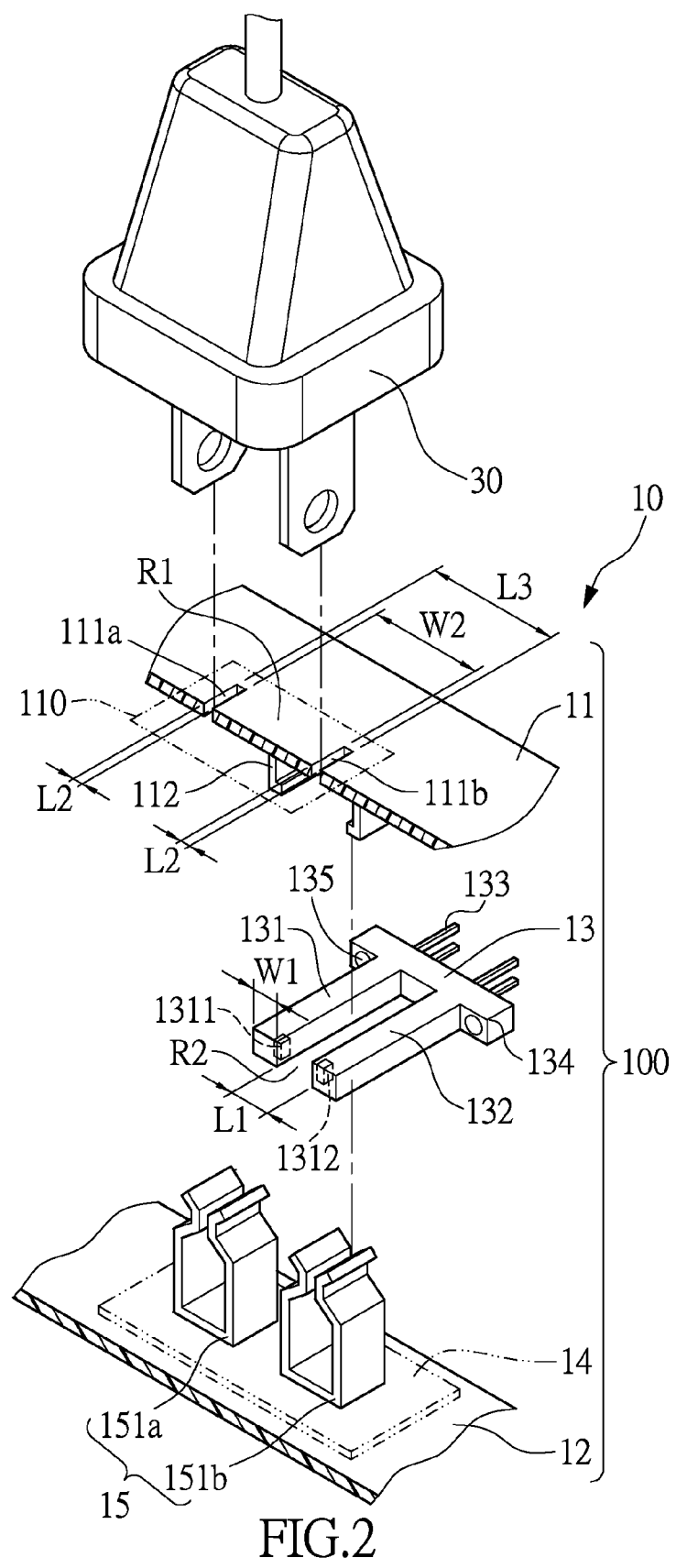
FIG. 2 is an entity relationship diagram of a power socket and a plug provided in accordance to an embodiment of the present disclosure.
Figure 3:
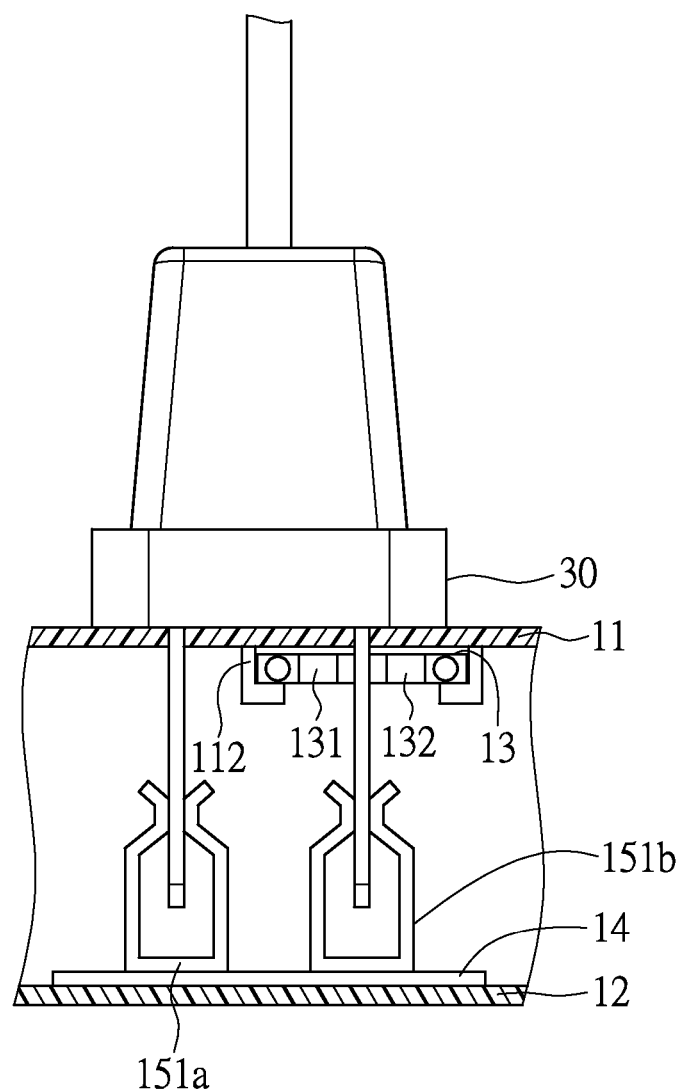
FIG. 3 is a side cross-sectional diagram of the power socket which is inserted with the plug provided in accordance to an embodiment of the present disclosure.
Figure 4:
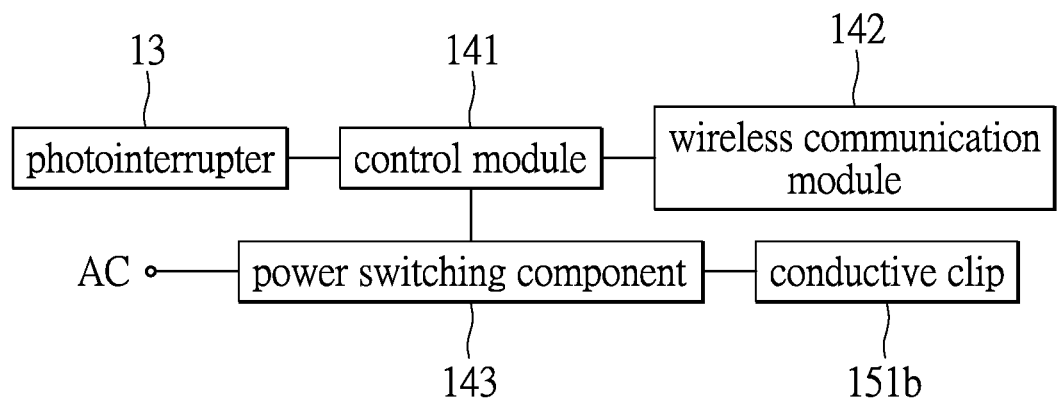
FIG. 4 is a block diagram of the power socket provided in accordance to an embodiment of the present disclosure.

More specifically, please refer to FIG. 1 to FIG. 4. FIG. 2 shows an entity relationship diagram of a power socket and a plug provided in accordance to an embodiment of the present disclosure. FIG. 3 shows a side cross-sectional diagram of the power socket which is inserted with the plug provided in accordance to an embodiment of the present disclosure. FIG. 4 shows a block diagram of the power socket provided in accordance to an embodiment of the present disclosure. As shown in FIG. 1 and FIG. 2, a main body 100 of the power socket 10 includes a upper shell 11, a lower shell 12, a photo-interrupter 13, a circuit board 14 and at least one conductive clip set 15, and the number of the conductive clip sets 15 may be configured depending upon the practical operation needs, and the instant embodiment is not limited thereto. In the instant embodiment, an outer surface of the upper shell 11 forms at least one jack set 110, and an inner surface of the upper shell 11 is disposed with a receiving structure 112. The receiving structure 112 is disposed around and under the jack 111b, and the receiving structure 112 has a receiving space for receiving the photo-interrupter 13. An inner surface of the lower shell 12 is disposed with the circuit board 14 and the conductive clip set 15. Each conductive clip set 15 has a plurality of conductive clips 151a and conductive clips 151b. The actual positions of the receiving structure 112 may be configured depending upon the practical operation needs, and the instant embodiment is not limited thereto. In other words, the receiving structure 112 may be disposed around the jack 111a or the jack 111c to receive the photo-interrupter 13.

Through the design of the receiving structure 112 in the power socket 10, it is convenient for a user to change the damaged photo-interrupter 13 without desoldering the old photo-interrupter 13 from the power socket 10 and soldering a new photo-interrupter 13 in the power socket 10. In comparison with the traditional power socket, it is easier and time saving for the user to change the photo-interrupter of the power socket from the receiving structure 112 in the present disclosure.

The photo-interrupter 13 is disposed in the main body 100 and under a jack set 110 of the power socket 10. The photo-interrupter 13 includes a sensing portion 131, a sensing portion 132, a conductive connecting terminal 133, a plurality of installing portions 134, and a plurality of installing holes 135. The sensing portion 131 is disposed with a light-emitting component 1311, such as a light-emitting diode (LED) or other type of light-emitting component, which is for emitting light. The sensing portion 132 is disposed with a light-receiving component 1312, which is for receiving a light emitted from the sensing portion 131. The photo-interrupter 13 determines whether a plug 30 is inserted into the jack set 110 according to whether the light emitted from the sensing portion 131 is interrupted or not, and the photo-interrupter 13 correspondingly generates a sensing signal. In addition, the installing holes 135 are configured for receiving a plurality of fasteners to lock the photo-interrupter 13 in the main body 100.

In another embodiment, the photo-interrupter 13 can be not disposed with the installing portions 134 and the installing holes 135, but instead with a buckle structure (not shown) in the receiving structure 112 to buckle the photo-interrupter 13. More specifically, the buckle structure may be a combination of a plurality of elastic bodies. The buckle structure restores to an extended position from a retracted position so as to buckle the photo-interrupter 13 when the photo-interrupter 13 is put into the receiving structure 112.

The circuit board 14 may be a printed circuit board (PCB), a flexible print circuit (FPC), or other type of circuit board. As shown in FIG. 4, the circuit board 14 includes a control module 141, a wireless communication module 142, and a power switching component 143. The control module 141 is electrically coupled to the conductive connecting terminal 133 of the photo-interrupter 13, the wireless communication module 142, and the power switching component 143. The power switching component 143 is electrically coupled between the conductive clip 151b and a power source, and the power source may be AC commercial power. The control module 141 may be an application specific integrated circuits (ASIC), a microprocessor, a digital signal processor (DSP), a programmable logic device (PLD), or a CPU module burned with software. The exact type of control modules 141 may be configured depending upon the practical operation needs, and the instant embodiment is not limited thereto. The wireless communication module 142 may be a near field communication (NFC) module, a radio frequency identification (RFID), or a communication module realized by other wireless communication technique. As long as the communication module can communicate with the monitor 40, the actual type of wireless communication module 142 may be configured depending upon the practical operation needs, and the instant embodiment is not limited thereto. The power switching component 143 may be a switching transistor, a relay, or other type of switching component.

According to the practical operation needs, the inner surface of the upper shell 11 of the power socket 10 may be disposed with another circuit board (not shown) and the circuit board is disposed with the control module 141 and the wireless communication module 142, and the circuit board on the inner surface of the lower shell 12 may be disposed with the power switching component 143. The actual positions of control module 141, wireless communication module 142, and power switching component 143 may be disposed on only one or a plurality of circuit boards according to the practical operation needs, and the instant embodiment is not limited thereto.

In the instant embodiment, as shown in FIG. 2, the sensing portion 131 and the sensing portion 132 are respectively disposed on two sides of the jack 111b. The sensing portion 131 is under the partition region R1, and a width W1 of the sensing portion 131 is less than a width W2 of the partition region R1 (i.e. a distance between the inside of the jack 111a and the inside of the jack 111b). A sensing region R2 is formed between the sensing portion 131 and the sensing portion 132, and the sensing region R2 is under the jack 111b. A length L1 (i.e. a distance between the sensing portion 131 and the sensing portion 132) of the sensing region R2 is more than or equal to the width L2 of the jack 111b. A distance L3 between the outside of the jack 111a and the outside of the jack 111b is more than the length L1 of the sensing region R2.

Notably, both of the sensing portion 131 and the sensing portion 132 extend along a horizontal direction, i.e., the direction substantially perpendicular to an inserting direction of the plug. Accordingly, compared to the electrical receptacle provided by prior art, U.S. Pat. No. 6,176,718, the power socket 10 of the instant embodiment can have thinner thickness and smaller size.

As shown in FIG. 2 and FIG. 3, when the plug 30 is inserted into a jack set 110 (e.g. jack 111a and jack 111b) of the power socket 10, the light emitted from the light-emitting component 1311 is interrupted by the plug 30 so that the light-receiving component 1312 cannot receive the light emitted from the light-emitting component 1311. At this moment, the photo-interrupter 13 correspondingly generates a sensing signal and transmits the sensing signal to the control module 141, and then the control module 141 transmits the sensing signal to the monitor 40 through the wireless communication module 142. The monitor 40 determines a presence of the plug 30 in the jack set 110 according to the sensing signal received. Otherwise, when the plug 30 is not inserted into a jack set 110, the monitor 40 determines no presence of the plug 30 in the jack set 110 according to the sensing signal received. In other words, the monitor 40 can determine an operation state of each jack set 110 on the power socket 10 according to the sensing signal generated by the photo-interrupter 13, so that the user can instantly know through the monitor 40 which jack set 110 on the power socket 10 has had a plug 30 inserted.

In addition, the user can control a plurality of jack sets 110 through the monitor 40. More specifically, the monitor 40 wirelessly transmits a control signal to the power socket 10. The control module 141 of the power socket 10 receives the control signal through the wireless communication module 142 and controls the power switching component 143 to enter an off state or a cutoff state according to the control signal received, so that the electrical connection between the commercial power AC and the jack 111b is correspondingly cutoff to stop providing power to the electronic device connected.

In short, by disposing a photo-interrupter 13 around a jack of each jack set 110, the monitor 40 can determine the operation state of each jack set 110 according to the sensing signal generated by each photo-interrupter 13, so that the user can conveniently and instantly know the power-supply state of every jack set 110 on each power socket 10. In addition, the user can wirelessly transmit a control signal to the power socket 10 to switch the power switching component 143 so as to control some jack sets 110 or every jack set 110 to enter the conduction state or the cutoff state (or off state). However, the user may dispose some photo-interrupters 13 around some jack sets 110 (not every jack set 110) of the power socket 10 according to practical operation needs, and the instant embodiment is not limited thereto.

In another embodiment, the conductive clip set can be designed to have another structure according to actual demands. In another embodiment, the conductive clip set can be formed by punching out a metal strip to form a plurality of conductive clips for respectively holding the conductive pins of the plug. The conductive clips respectively correspond to the jacks of the jack set. In this case, the photo-interrupters 13 may be disposed under the conductive clip 151a or the conductive clip 151b. When the plug 30 is inserted into the jack set 110, each of the conductive pins of the plug 30 passes through the corresponding conductive clip and extends into the sensing region R2 between the sensing portion 131 and the sensing portion 132 of the photo-interrupters 13. As long as the photo-interrupters 13 can assist the monitor 40 to determine whether a plug is inserted into the jack set 110, the actual positions of the photo-interrupters 13 may be configured depending upon the practical operation needs, and the instant embodiment is not limited thereto. In addition, the photo-interrupters 13 may not be in a U-shaped element. As long as the photo-interrupters 13 can sense whether a plug is inserted into the jack set through the sensing portion 131 and the sensing portion 132, the actual shapes of the photo-interrupters 13 and the conductive clip set 15 may be configured depending upon the practical operation needs, and the instant embodiment is not limited thereto.

Figure 5:
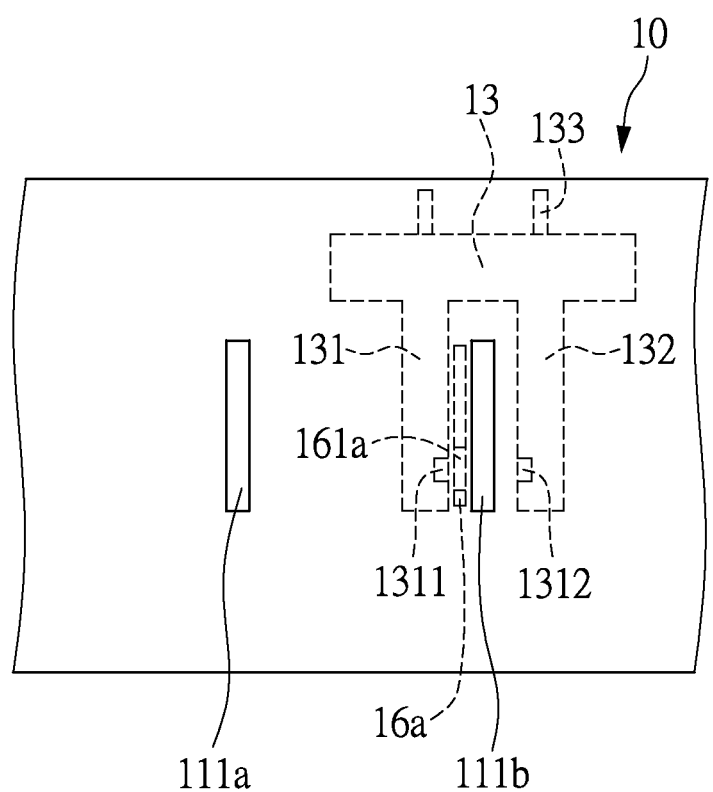
FIG. 5 is a schematic diagram of an insulation disposed between a photo-interrupter and a jack provided in accordance to an embodiment of the present disclosure.

Please refer to FIG. 5, which shows a schematic diagram of an insulation disposed between a photo-interrupter and a jack provided in accordance to an embodiment of the present disclosure. As shown in FIG. 5, an insulation 16a is disposed between the photo-interrupters 13 and a jack (e.g. jack 111b) of the jack set 110 to reduce the short probability between the conductive pin in the jack and the photo-interrupters 13. More specifically, the insulation 16a is disposed in the sensing region R2 and at one side of the sensing portion 131 which faces the sensing portion 132. The insulation 16a is under the partition region R1 and near an edge of the jack 111b. The insulation 16a is a transparent component or non-transparent component. If the insulation 16a is a transparent component, the light emitted from the photo-interrupters 13 can directly penetrate through the insulation 16a without impacting the sensing performance of the photo-interrupters 13. Otherwise, if the insulation 16a is a non-transparent component, the insulation 16a is disposed with a through-hole 161a to transmit the light emitted from the light-emitting component 1311 to the light-receiving component 1312. As long as the photo-interrupters 13 can operate normally and the short circuit between the photo-interrupters 13 and the conductive pin in the jack 111b can be avoided, the type of the insulation 16a is not limited in the instant embodiment.

Figure 6:
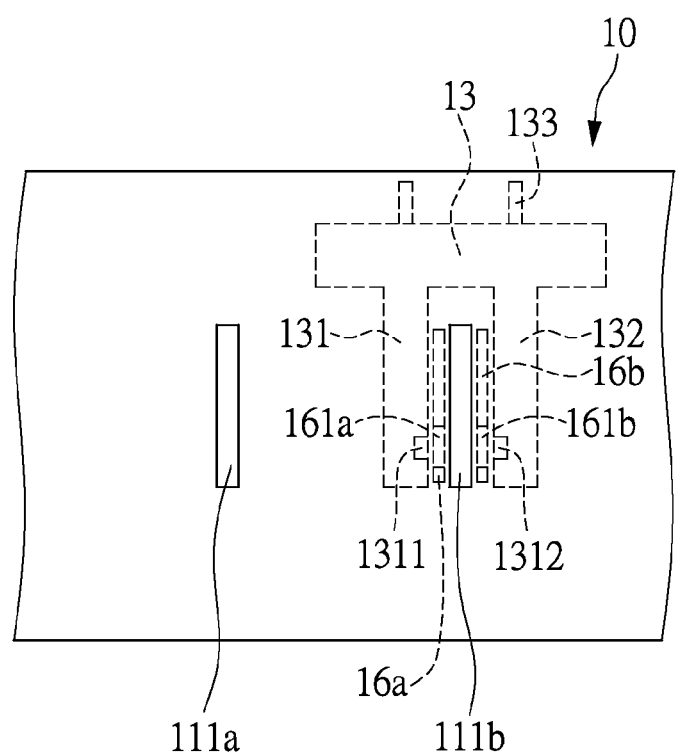
FIG. 6 is a schematic diagram of two insulations disposed between a photo-interrupter and a jack provided in accordance to an embodiment of the present disclosure.

On the other hand, please refer to FIG. 6, which shows a schematic diagram of two insulations disposed between a photo-interrupter and a jack provided in accordance to an embodiment of the present disclosure. As shown in FIG. 6, an insulation 16b is further disposed at one side of the sensing portion 132 which faces the sensing portion 131 and is under the partition region R1 and near another edge of the jack 111b. The same as the insulation 16a, the insulation 16b is also disposed in the sensing region R2 and with a through-hole 161b to transmit the light emitted from the light-emitting component 1311 to the light-receiving component 1312. The isolation of the insulation 16a and the insulation 16b is more effective to reduce the short probability between the conductive pin in the jack 111b and the photo-interrupters 13.

Figure 7:
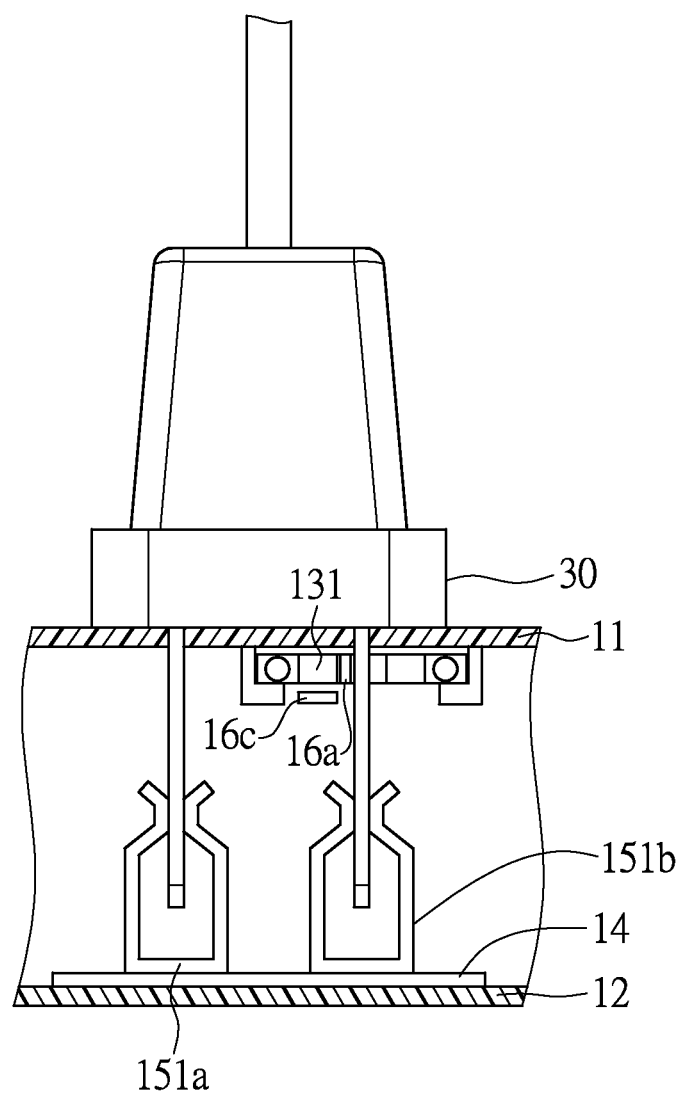
FIG. 7 is a side cross-sectional diagram of a power socket which is disposed with a plurality of insulations at two adjacent sides of a sensing portion of a photo-interrupter provided in accordance to an embodiment of the present disclosure.
Figure 8:
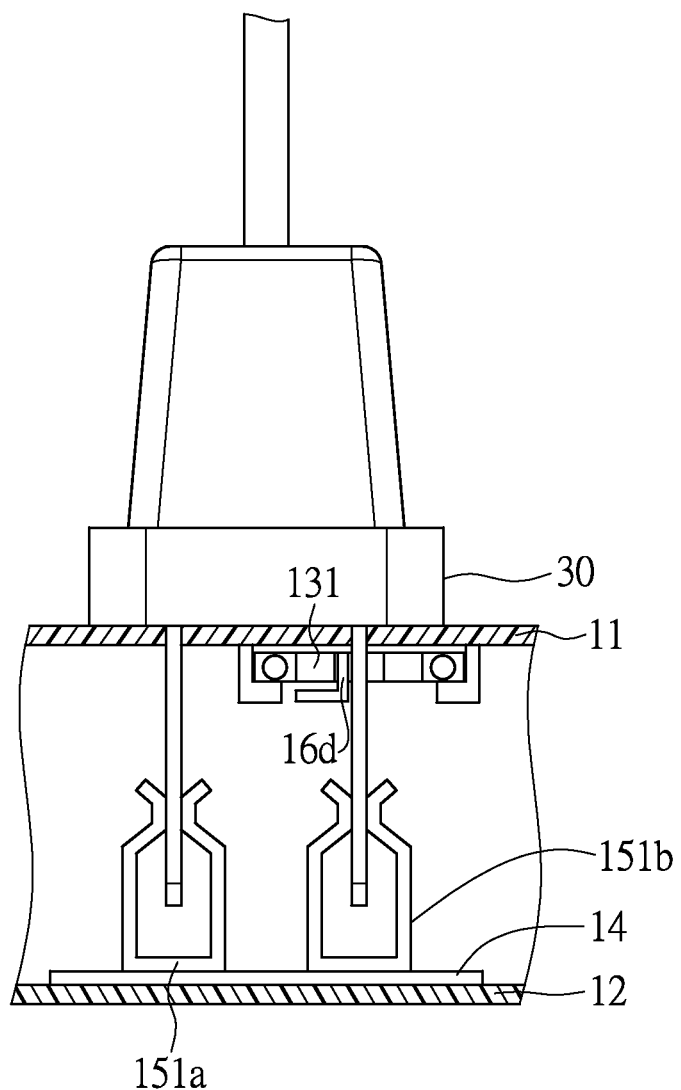
FIG. 8 is a side cross-sectional diagram of a power socket which is disposed with a reverse L-shaped insulation at two adjacent sides of a sensing portion of a photo-interrupter provided in accordance to an embodiment of the present disclosure.

In addition, please refer to FIG. 7, which shows a side cross-sectional diagram of a power socket which is disposed with a plurality of insulations at two adjacent sides of a sensing portion of a photo-interrupter provided in accordance to an embodiment of the present disclosure. As shown in FIG. 7, the instant embodiment differs from the embodiment in FIG. 5 in that an insulation 16c is further disposed under the sensing portion 131 (or/and sensing portion 132) so as to isolate the sensing portion 131 and the conductive clip 151b. In another embodiment, please refer to FIG. 8, which shows a side cross-sectional diagram of a power socket which is disposed with a reverse L-shaped insulation at two adjacent sides of a sensing portion of a photo-interrupter provided in accordance to an embodiment of the present disclosure. As shown in FIG. 8, the instant embodiment differs from the embodiment in FIG. 7 in that the insulation 16a and the insulation 16c may be integrated into a reverse L-shaped insulation 16d. The exact number and type of the insulation may be configured depending upon the practical operation needs, and the instant embodiment is not limited thereto.

Figure 9:
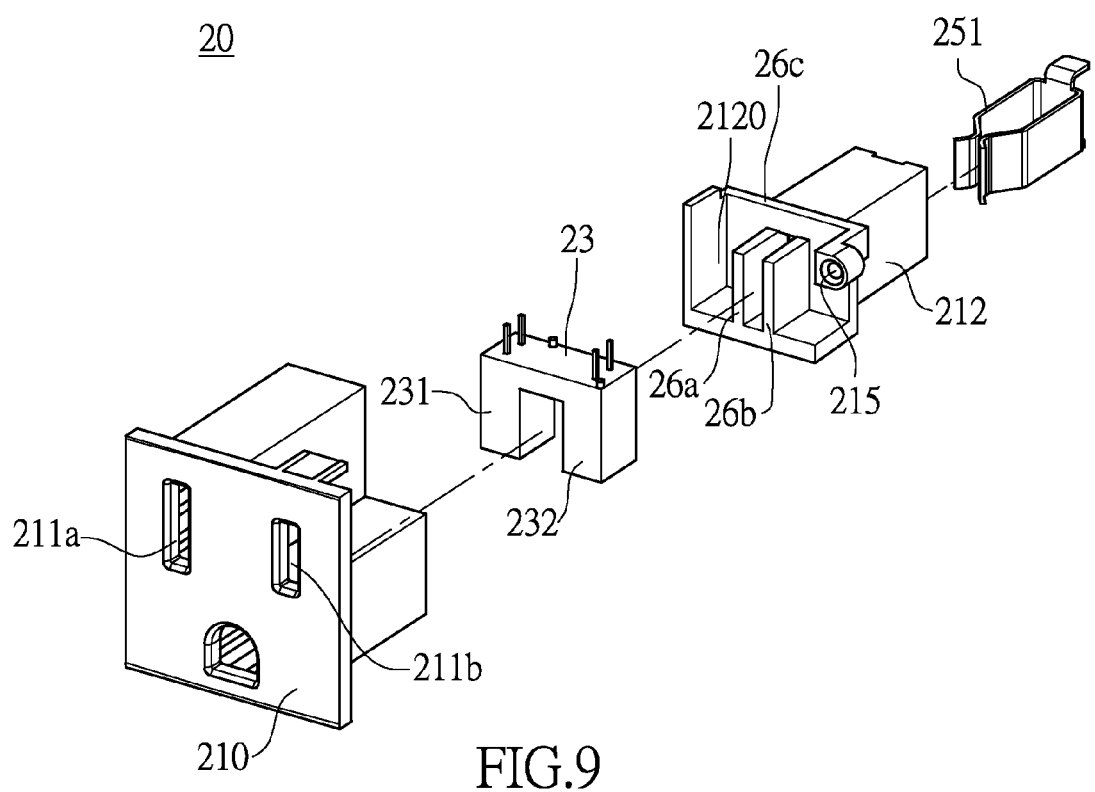
FIG. 9 is an exploded diagram of another power socket provided in accordance to an embodiment of the present disclosure.

Please refer to FIG. 9, which shows an exploded diagram of another power socket provided in accordance to an embodiment of the present disclosure. As aforementioned, the power socket 20 also includes the jack set 210, the photo-interrupter 23 (may not have the conductive connecting terminal 133), the receiving structure 212, and the conductive clip 251. In the instant embodiment, similarly, the receiving structure 212 is disposed under the jack set 210 and with a receiving space 2120 to receive the photo-interrupter 23. However, the instant embodiment differs from the embodiment in FIG. 2 in that the receiving structure 212 is disposed with an insulation 26a, an insulation 26b, and an insulation 26c. The insulation 26a, the insulation 26b, and the insulation 26c are isolating walls to avoid causing a short circuit happening in the power socket 20. Further, the insulation 26a is configured for isolating the sensing portion 231 and the conductive pin in the jack 211b. The insulation 26b is configured for isolating the sensing portion 232 and the conductive pin in the jack 211b. The insulation 26c is configured for isolating the photo-interrupter 23 and the conductive chip 251. In addition, the receiving structure 212 is further disposed with another receiving space (not shown) and an installing hole 215. The receiving space receives the conductive chip 251, and the installing hole 215 receives the fastener to lock the receiving structure 212 in the jack set 210. Through the receiving structure 212, the user can simply and quickly change the old photo-interrupter 23.

In summary, exemplary embodiments of the present disclosure provide a technique for controlling at least one power socket through wireless remote control. Each of the power sockets is disposed with at least one photo-interrupter to sense whether a plug is inserted into the jack set of the power socket, and an insulation is disposed between the photo-interrupter and the jack to avoid causing a short circuit phenomenon between the photo-interrupter and the conductive pin in the jack. Therefore, a monitor can determine the operation state of each jack set of each power socket according to the sensing results of the photo-interrupters in the power sockets. A user can cut off or maintain power supplied from the jack set through a wireless remote control way so as to provide or stop providing power to an electronic device which is connected to the jack set. In addition, when the photo-interrupter is damaged, the user can just change the old photo-interrupter without buying a new power socket.

In addition, the conditions for determining whether the power is provided in the instant disclosure are different from that in the prior art, U.S. Pat. No. 6,176,718. Specifically, the prior art discloses when the light emitted by the LED is completely blocked, i.e., the light amount is smaller than the characteristic amount, the control circuit does not provide power to decrease the risk of electrocution due to the insertion of foreign objects, such as a children's finger or conductive object.

However, in the instant disclosure, the photo-interrupter is used to detect whether the plug is inserted into the jack set of the power socket so that the user can monitor the operation state of each of the jack sets. In addition, the user can wirelessly transmit a control signal to the power socket to switch the power switching component so as to control some jack sets or every jack set to enter the conduction state or the cutoff state (or off state). That is, under one of the circumstances, when the conductive pins of the plug completely block the light emitted by the light-emitting component, the control module can control the power switching component to supply power according to the control signal transmitted by the user. Thus, the technique features of the instant disclosure are different from that of the prior art.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A power socket, comprising:
   a main body, having a jack set, and the jack set having a first jack and a second jack, wherein a partition region is formed between the first jack and the second jack;
   a photo-interrupter, disposed in the body and under the jack set; wherein, the photo-interrupter has a first sensing portion and a second sensing portion, the first sensing portion is under the partition region, and the width of the first sensing portion is less than the width of the partition region, a sensing region is formed between the first sensing portion and the second sensing portion, and the sensing region is under the first jack, and the length of the sensing region is more than or equal to the width of the first jack;

a wireless communication module;

a power switching component, switched to cut off or maintain power supplied from the jack set; and a control module, electrically coupled to the wireless communication module, the power switching component, and the photo-interrupter.

2. The power socket according to claim 1, further comprising:

an insulation, disposed at one side of the first sensing portion which faces the second sensing portion, and the insulation being under the partition region and near an edge of the first jack.

3. The power socket according to claim 2, wherein the insulation is a transparent component or has a through-hole.

4. The power socket according to claim 1, wherein the body further has a receiving structure, and the receiving structure is under the jack set and configured for receiving the photo-interrupter.

5. The power socket according to claim 1, wherein the first sensing portion has a light-emitting component, and the second sensing portion has a light-receiving component.

6. The power socket according to claim 1, wherein the control module transmits a sensing signal according to a sensing result of the photo-interrupter, and the control module switches the power switching component to cut off or maintain power supplied from the jack set according to a control received.

7. The power socket according to claim 1, further comprising a conductive clip set disposed under the jack set and corresponding to the first jack, wherein the photo-interrupter is disposed under the conductive clip set.

* * * * *